Dec. 6, 1955   J. J. HENSCHKE, JR   2,725,823
ELECTRIC BLASTING CAPS
Filed Sept. 27, 1951
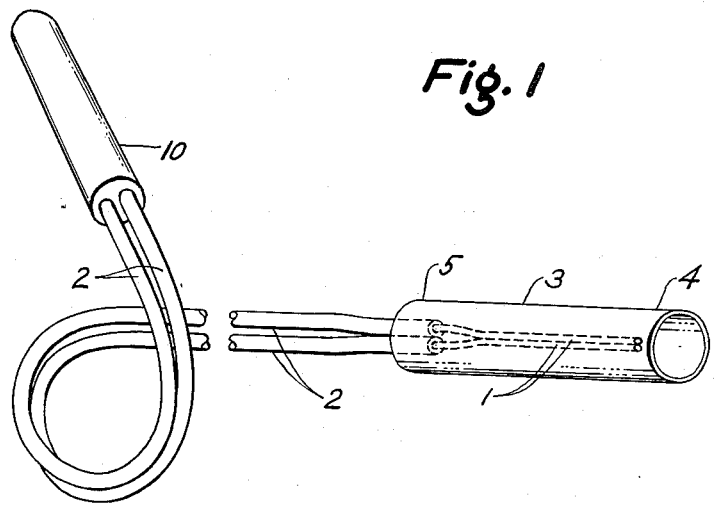
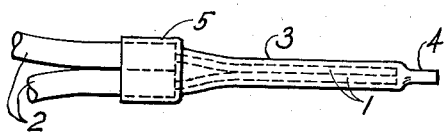
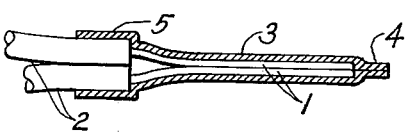
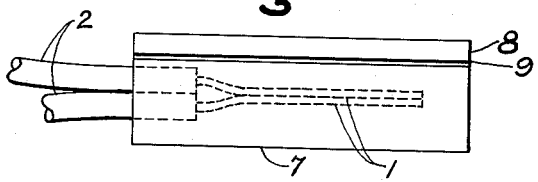
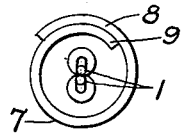
INVENTOR.
John J. Henschke, Jr.
BY *Clelle W. Upchurch*
AGENT ns Patent Office 2,725,823
Patented Dec. 6, 1955

2,725,823

ELECTRIC BLASTING CAPS

John J. Henschke, Jr., Webster Groves, Mo., assignor to Olin Mathieson Chemical Corporation, a corporation of Virginia Application September 27, 1951, Serial No. 248,552

2 Claims. (Cl. 102—28)

This invention relates to electric blasting caps and more particularly to new and improved protective means for the bared end portions of electric blasting cap lead wires.

Electric blasting caps are generally supplied with lead wires several feet in length. These lead wires are mainly insulated but the end portions thereof are ordinarily left bare of insulation in order that they may be connected into a firing circuit. It is well known that the lead wires of electric blasting caps might inadvertently come in contact with a source of electricity capable of prematurely firing the cap and that the uninsulated end portions of the lead wires must be protected. The protective means utilized for this purpose must not only provide adequate electrical protection but also be easily and quickly removable from the lead wires without damage thereto.

Protective means for the uninsulated end portions of lead wires suggested heretofore include shunting the wires by maintaining the bared portions of the two wires in electrical contact by twisting together or by means of a metallic conducting member such as a metallic eyelet, clip, metallic foil or similar device. It has now been found that no metallic shunt is completely safe and that an electric blasting cap can be inadvertently fired electrically in spite of such a shunt. For this reason, it is evident that the bared portions of the lead wires should be entirely enclosed within a non-conducting material. It has been suggested that a rubber sleeve might be slipped over the bared portions of the wires, that the wires might be wrapped in an impregnated fabric or in metallic foil coated on one side with a dielectric material such as lacquer. None of these methods have been entirely successful. For instance, it is very difficult to insert the wires in a rubber sleeve. The impregnated fabric protective means must be formed by wrapping the fabric around the wires and cementing. Such a protective means is frequently lost from the wires due to failure of the cement or failure to wrap the fabric sufficiently tight to insure frictional engagement with the wires. Likewise, wrapping the bared end portions of the wires with metallic foil coated with a dielectric material does not necessarily accomplish the object in all instances as complete protection from inadvertent firing of the blasting cap is dependent upon a thin dielectric film acting as a complete barrier to electric currents of all potential. If the dielectric film is pierced by the wires or broken in any way during the wrapping operation, the protective means is then of course no better than other metallic shunts. Due to the opacity of the foil, it is impossible to determine after installation of the protective means whether or not the dielectric film remains intact and the electric blasting cap is entirely free from susceptibility to inadvertent electrical firing. Another disadvantage inherent with the prior art protective devices is the wires must be kinked to lock the device thereabout and prevent the device from being inadvertently lost therefrom. The kinked wires must be straightened before an electrical contact can be made thus requiring the operator to be exposed to the explosive cap for a greater length of time. Anything which could result in poor electrical connection must be avoided if possible because failure of a cap to fire can result in a serious accident.

An object of this invention is to provide an electric blasting cap which comprises a novel protective means devoid of the disadvantages inherent to heretofore known protective devices. Another object of this invention is an electric blasting cap provided with an improved protective means which in normal handling will grasp the lead wires but can be rapidly and easily removed therefrom when desired. Another object of this invention is to provide a non-conductive protective means for the bared end portions of electric blasting cap lead wires which insures complete protection from inadvertent contact with electrical currents. A further object is to provide a process for enclosing the bared end portions of electric blasting cap lead wires with a non-metallic protective means which prevents corrosion thereof and can be easily removed therefrom when desired.

In accordance with this invention, the bared end portions of electric blasting cap lead wires are jointly enclosed in a shrinkable, non-fibrous, non-conducting pellicle and the pellicle then contracted about said wires. The non-fibrous pellicle may be advantageously tubular in form having a sufficiently large internal diameter while in its dilated state to facilitate insertion of the wires thereinto and to provide a frictional fit, grasping or exerting pressure against the wires in its contracted state; or the pellicle may be in the form of a sheet, ribbon, strip or the like particularly if the non-fibrous material is inherently cohesive. The pellicle should preferably be of sufficient length to extend beyond the extremities of the bared portion of the lead wires and, if desired, to extend over a portion of the insulated wires to insure complete protection. The pellicle may be transparent or opaque or may be dyed any color to conveniently distinguish electric blasting caps of various types from each other.

Referring to the accompanying drawings which show various phases of this invention, Figure 1 is a perspective view illustrating the initial condition of a tubular pellicle or sleeve after insertion of the bared end portions of the lead wires of an electric blasting cap while Figure 2 illustrates the final condition after shrinking the pellicle. Figure 3 is a longitudinal sectional view of the constricted pellicle shown in Figure 2. Figure 4 illustrates the initial stage of another embodiment wherein a dilated shrinkable non-fibrous film has been wrapped about the bared end portions of the lead wires and Figure 5 is an end view of the pellicle and lead wires shown in Figure 4.

In the embodiment shown in Figures 1 and 2, the bared end portions 1 of the lead wires 2 extending from blasting cap 10 are inserted in a previously prepared wet, shrinkable, tubular, non-fibrous pellicle 3, such as, for example, a cellulose pellicle regenerated from viscose. The internal diameter of the dilated pellicle 3 is sufficiently greater than the diameter of the wires 2 to facilitate insertion therein. As best shown in Figure 1, one end of the tubular pellicle 3 preferably extends beyond the extremities of the lead wires as shown at 4 while the other end preferably extends beyond the juncture of the bared portions of the lead wires with the insulated portions of the wires as shown at 5. The pellicle 3 is then shrunk about the wires by air drying. The pellicle 3 will upon shrinking assume the position shown in Figure 2 and thus not only completely protect the bared end portions of the wires from electrical contact and corrosion but also due to the tension exerted by the contracted pellicle 3 contiguous with the wires, maintain the two wires in electrical contact and act as a shunt thus insuring some degree of protection even if a portion of the tube should inadvertently be destroyed or removed. The longitudinal-sectional view in Figure 3 better illustrates the position of the bared wires 1 with respect to the shrunken pellicle 3 after drying.

The embodiment shown in Figures 4 and 5 illustrates a method of protecting the bared portions 1 of lead wires 2 by means of a sheet of limp, distended material capable of shrinking substantially upon drying such as, for example, cellulose regenerated from viscose. As shown in Figure 4, the two lead wires are loosely wrapped with more than one convolution of the sheet material 8. The overlapping portions best shown in Figure 5 at 8 and 9, are then tightly compressed as with the fingers or in some similar manner whereupon due to the inherent cohesive properties of the distented sheet, the two layers 8 and 9 of the pellicle 7 remain adhered to each other during and after shrinking. The distended pellicle 7 is then air dried and assumes a position grasping and contiguous with the wires similar to that shown in Figures 2 and 3 and affords adequate protection against corrosion and electrical currents. The pellicle 7 utilized in this embodiment is advantageously of greater length than the bared end portions 1 of the lead wires 2 and after shrinking not only covers the bared portions 1 but also extends somewhat beyond the extremities of the wires and encloses a portion of the insulated wire. As in the embodiment shown in Figures 1 and 2, the inherent nature of the material insures electrical contact between the two bared portions 1 of the lead wires 2.

The pellicle utilized in either of the foregoing examples should of course be plasticized to an extent that it is not sufficiently brittle to break upon shrinking or from rather rough handling. Aproximately 10-15 per cent glycerine will satisfactorily plasticize pellicles regenerated from viscose for most purposes. When it is desired to remove the pellicle, the operator can merely grasp a lead wire in each hand at some place between the protective means and the blasting cap and pull them apart whereupon the protective means will tear and fall from the lead wires. Corrosion of the bared portions of the wires has been prevented and the wires are free of kinks or other deformities which would interfere when connecting the blasting cap to a blasting machine or in making other electrical contacts.

While specific examples have been utilized in the foregoing to describe this invention it is not intended that it be limited to such examples. Pellicles other than those obtained from the regeneration of cellulose from viscose can be utilized to advantage in practicing this invention. For instance regenerated cellulose pellicles obtained from cuprammonium cellulose solution or pellicles obtained from cellulose ethers such as ethyl cellulose or glycol cellulose which have been cast in water solution or pellicles of gelatin and related materials may also be utilized. Cellulose esters which might be utilized in practicing this invention include cellulose acetate, cellulose propionate, cellulose butyrate, cellulose stearate, cellulose acetate propionate, cellulose acetate butyrate, cellulose nitrate and the like properly dilated with a mixture of a solvent and swelling agent or with a swelling agent alone. Typical swelling agents which may be utilized are ethyl alcohol, methyl alcohol, ethyl acetate, propyl acetate and the like. Suitable solvents include methyl acetate, acetone, cyclohexanone and the like. The proportion of swelling agent and solvent in the dilating mixture is governed by the particular type of pellicle utilized and may vary from 5 parts solvent and 95 parts swelling agent to 1 part solvent and 2 parts swelling agent. In addition, synthetic resins such as the vinyls, the acrylates, the polyamides and the like together with appropriate dilators may be used in practicing this invention. Upon drying, these pellicles will shrink to form a continuous taut covering grasping the bared portions of the lead wires. It is also contemplated that the wires can be enclosed in one or more convolutions of film of a thermoplastic resin such as rubber hydrochloride while at an elevated temperature which will upon cooling contract and form the desired taut protective means. The thickness of pellicle most desirable for the purpose will vary with the particular material constituting the pellicle, amount of time and equipment available for shrinking, etc. In most instances, however, a pellicle having a thickness of about .005 inch to about .020 inch after shrinking is satisfactory. Preferably the constricted pellicle used should not stretch or elongate substantially more than 30% before rupturing.

It may be desirable in some instances when utilizing a pellicle in accordance with this invention which is not inherently waterproof to coat the pellicle after shrinking about the uninsulated lead wires with a waterproofing material. This can be accomplished by dipping the pellicle in a waterproof lacquer composition or by brushing with a film of lacquer or similar waterproofing coating composition.

From the foregoing description, it will be apparent to those skilled in the art that the invention accomplishes its objects in providing a blasting cap which comprises a non-metallic protective means enwrapping and contiguous with the bared portions of the lead wires which affords ample protection against corrosion and inadvertent contact with electric currents, cannot be accidently removed from the wires but can be quickly and easily removed therefrom when desired.

Having thus described the invention what is desired to secure by Letters Patent is:

1. The process for forming a protective and shunting means about the bared end portions of insulated lead wires of electric blasting caps which consists in inserting said end portions side by side into a wet, dilated, sleeve of regenerated cellulose and thereafter drying and thus contracting said sleeve into grasping engagement with the entire length of said bared end portions of the lead wires, whereby said bared end portions are held in electrical contact with each other solely by said sleeve and are substantially completely enclosed thereby.

2. An electric blasting cap having insulated lead wires with uninsulated end portions remote from said cap, and a shunting means consisting of a preformed sleeve of regenerated cellulose disposed and shrunk about said end portions as a pair and pressing them into electrical contact with each other; said sleeve being adapted to be torn and removed from said end portions without substantial distortion thereof by grasping one lead wire of the pair in each hand and pulling said wires apart.

References Cited in the file of this patent

UNITED STATES PATENTS

| | | |
|---|---|---|
| 1,354,905 | Hamilton | Oct. 5, 1920 |
| 1,835,753 | Brewster | Dec. 8, 1931 |
| 1,937,538 | Wright | Dec. 5, 1933 |
| 1,977,643 | Moss | Oct. 23, 1934 |
| 2,649,735 | Feild | Aug. 25, 1953 |

FOREIGN PATENTS

| | | |
|---|---|---|
| 113,469 | Great Britain | Feb. 18, 1918 |
| 199,523 | Great Britain | June 28, 1923 |
| 336,423 | Great Britain | Oct. 16, 1930 |